US008396076B2

(12) United States Patent
Borella et al.

(10) Patent No.: US 8,396,076 B2
(45) Date of Patent: *Mar. 12, 2013

(54) SYSTEM AND METHOD FOR ROAMING BETWEEN WIRELESS NETWORKS

(75) Inventors: Michael S. Borella, Naperville, IL (US); Sundar Raman, Arlington Heights, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,606

(22) Filed: Dec. 22, 2011

(65) Prior Publication Data

US 2012/0093142 A1    Apr. 19, 2012

Related U.S. Application Data

(60) Division of application No. 12/766,292, filed on Apr. 23, 2010, now Pat. No. 8,107,496, which is a continuation of application No. 10/186,810, filed on Jul. 1, 2002, now Pat. No. 7,733,904.

(60) Provisional application No. 60/352,347, filed on Jan. 28, 2002.

(51) Int. Cl.
*H04J 3/16* (2006.01)

(52) U.S. Cl. ........ 370/467; 370/464; 370/465; 370/466; 370/338; 370/352; 370/395.5; 455/432.1; 455/432.2; 709/227; 709/228; 709/230; 709/249

(58) Field of Classification Search ............... 455/432.1, 455/432.2, 432.3, 433, 426, 435.1, 435.2; 357/401, 465, 466, 467, 469, 331, 338, 345, 357/352, 356, 395.5, 395.51; 709/227, 228, 709/229, 230, 231, 232, 246, 249; 370/401, 370/465, 466, 467, 469, 331, 338, 345, 352, 370/356, 395.5, 395.51

See application file for complete search history.

(56) References Cited

U.S. PATENT DOCUMENTS

| | | | |
|---|---|---|---|
| 5,440,613 A * | 8/1995 | Fuentes | 455/436 |
| 5,764,899 A | 6/1998 | Eggleston et al. | |
| 5,809,028 A | 9/1998 | Nethercott et al. | |
| 5,812,531 A | 9/1998 | Cheung et al. | |
| 5,862,481 A * | 1/1999 | Kulkarni et al. | 455/432.2 |
| 5,949,775 A | 9/1999 | Rautiola et al. | |
| 6,002,931 A * | 12/1999 | Yamaguchi et al. | 455/433 |
| 6,332,077 B1 | 12/2001 | Wu et al. | |
| 6,405,254 B1 | 6/2002 | Hadland | |

(Continued)

OTHER PUBLICATIONS

3GPP2 P.S0001-A Version 1.0.0: Wireless IP Network, Jul. 14, 2000.

(Continued)

*Primary Examiner* — Olumide T Ajibade Akonai

(57) ABSTRACT

Systems and methods for roaming between a mobile node and at least one serving node connected to a network are disclosed. The present application provides a method for roaming between. In the system and method, a first communication is established between the mobile node and one of the serving nodes through a control server, when an Ethernet transceiver is used by the mobile node. Ethernet is used for communications between the mobile node and the control server, and a wireless communication technology for communications between the control server and the serving node. The control server also translates communications between Ethernet and the wireless communication technology. In the system and method, a second communication is established between the mobile node and one of the serving nodes with the wireless communication technology, when a wireless communication technology transceiver is used by the mobile node.

17 Claims, 8 Drawing Sheets

U.S. PATENT DOCUMENTS

| | | | |
|---|---|---|---|
| 6,453,174 B1 * | 9/2002 | Cunningham et al. | 455/560 |
| 6,577,643 B1 | 6/2003 | Rai et al. | |
| 6,580,699 B1 | 6/2003 | Manning et al. | |
| 6,651,105 B1 | 11/2003 | Bhagwat et al. | |
| 6,684,073 B1 * | 1/2004 | Joss et al. | 455/433 |
| 6,763,012 B1 | 7/2004 | Lord et al. | |
| 6,876,640 B1 | 4/2005 | Bertrand et al. | |
| 6,940,869 B1 | 9/2005 | Wang et al. | |
| 7,039,027 B2 | 5/2006 | Bridgelall | |
| 7,075,930 B1 | 7/2006 | Chen et al. | |
| 7,099,295 B1 | 8/2006 | Doyle et al. | |
| 7,154,868 B1 | 12/2006 | Sharma et al. | |
| 7,155,526 B2 | 12/2006 | Chaudhary et al. | |
| 7,266,130 B2 | 9/2007 | Lee et al. | |
| 2002/0068559 A1 | 6/2002 | Sharma et al. | |
| 2002/0068562 A1 | 6/2002 | Gerszberg et al. | |
| 2002/0083203 A1 | 6/2002 | Lim | |
| 2002/0085516 A1 | 7/2002 | Bridgelall | |
| 2002/0101857 A1 | 8/2002 | Heller | |
| 2002/0147008 A1 | 10/2002 | Kallio | |
| 2002/0191635 A1 | 12/2002 | Chow et al. | |
| 2002/0196749 A1 | 12/2002 | Eyuboglu et al. | |
| 2003/0086423 A1 | 5/2003 | Hsu | |
| 2003/0134636 A1 | 7/2003 | Sundar et al. | |
| 2004/0014497 A1 | 1/2004 | Tjalldin et al. | |

OTHER PUBLICATIONS

CommWorks a 3Com Company, "3 G Data System for cdma 2000 Wireless Networks", 2001.

Congdon, et al. "IEEE 802.1X Radius Usage Guidelines"; Internet Engineering Task Force (IETF), Internet-Draft <draft-congdon-radius-8021x 20.txt>, Jun. 17,2002.

Draft Supplement to Standard (for) Information Technology—Telecommunications and information exchange 1 between systems—Local and metropolitan area networks—Specific requirements—Part 11: Wireless LAN Medium Access Control (MAC) and Physical Layer (PHY) specifications: Further Higher-Speed Physical Layer Extension in the 2.4 0 GhzBand, IEEStd 802.11g/D6.1, Jan. 2003 (Supplement to ANSI/IEEE Std 802.11199 (Reaff 2003>>, pp. 1-58.

IEEE Std 802 lla-1999, "Part 11 : Wireless LAN Medium Access Control (MAC) and Physical Layer (PHY) Specifications—High Speed Physical Layer in the 5 GHz Band", IEEE Computer Society. 1999.

IEEE Std 802.11 b-1999, "Part 11: Wireless LAN Medium Access Control (MAC) and Physical Layer (PHY) Specifications: Higher-Speed Physical Layer Extension in the 2.4 GHz Band", IEEE Computer Society, Sep. 16, 1999.

IEEE Std 802.11, "Information Technology—Telecommunications and Information Exchange Between Systems—Local and Metropolitan Area Networks Specific Requirements", 1999 edition.

IEEE std 802.1X-2001, "IEEE Standard for Local Metropolitan Area Networks—Port-Based Network Access Control", IEEE Computer Society, Jun. 14, 2001.

IEEE Std 802.3. 2000 Edition, "Part 3: Carrier Sense Multiple Access With Collision Detection (CSMA/CD) Access Methods and Physical Layer Specifications", IEEE Computer Society 2000.

Internet Engineering Task Force (IETF), Requests for Comments (RFC) 1661, "The Point-To-Point Protocol (PPP)", Jul. 1994.

Internet Engineering Task Force (IETF), Requests for Comments (RFC) 1662, "PPP in HDLC-Like Framing", Jul. 1994.

Internet Engineering Task Force (IETF), Requests for Comments (RFC) 2002, "IP Mobility Support", Oct. 1996.

Internet Engineering Task Force (IETF), Requests for Comments (RFC) 2003, "IP Encapsulation Within IP", Oct. 1996.

Internet Engineering Task Force (IETF), Requests for Comments (RFC) 2004, "Minimal Encapsulation Within IP", Oct. 1996.

Internet Engineering Task Force (IETF), Requests for Comments (RFC) 2005, "Applicability Statement for IP Mobility Support", Oct. 1996.

Internet Engineering Task Force (IETF), Requests for Comments (RFC) 2006, "The Definition of Managed Objects for IP Mobility Support Using SMIv2", Oct. 1996.

Internet Engineering Task Force (IETF), Requests for Comments (RFC) 2138; "Remote Authentication Dial in User Service (RADIUS)", Apr. 1997.

Internet Engineering Task Force (IETF), Requests for Comments (RFC) 2139, "RADIUS Accounting", Apr. 1997.

Internet Engineering Task Force (IETF), Requests for Comments (RFC) 2284, "PPP Extensible Authentication Protocol (EAP)", Mar. 1998.

Internet Engineering Task Force (IETF), Requests for Comments (RFC) 2516, "A Method for Transmitting PPP Over Ethernet (PPPoE)", Feb. 1999.

Internet Engineering Task Force (IETF), Requests for Comments (RFC) 2865, "Remote Authentication Dial in User Service (RADIUS)", Jun. 2000.

Internet Engineering Task Force (IETF), Requests for Comments (RFC) 2866, "RADIUS Accounting", Jun. 2000.

Internet Engineering Task Force (IETF), Requests for Comments (RFC) 2867, "RADIUS Accounting Modification for Tunnel Protocol Support", Jun. 2000.

PCT International Search Report for 3Com Corporation et al., in PCT/US03/20285. Jun. 2003.

* cited by examiner

SYSTEM AND METHOD FOR ROAMING BETWEEN WIRELESS NETWORKS

RELATED APPLICATIONS

This application is a divisional of U.S. patent application Ser. No. 12/766,292, filed Apr. 23, 2010 now U.S. Pat. No. 8,107,496, which claimed the benefit of and is a continuation of U.S. patent application Ser. No. 10/186,810 filed Jul. 1, 2002 now U.S. Pat. No. 7,733,904, which claimed the benefit of U.S. Provisional Application No. 60/352,347, filed Jan. 28, 2002, incorporated by reference herein.

FIELD OF INVENTION

The present application relates to a system and method for seamless roaming between different wireless networks. In particular, the present application relates to a system and method for seamless roaming between CDMA (or GSM) and wireless Ethernet (IEEE 802.11) networks.

BACKGROUND OF THE INVENTION

Currently, wireless devices are typically restricted to roaming between access gateways, such as CDMA2000 PDSNs, GPRS/UMTS GGSNs, and IEEE 802.11 access points, of the same technology. For example, CDMA2000 mobiles can typically only access an IP network via CDMA2000 radio access networks and a packet data serving node (PDSN).

As third generation (3G) networks emerge, it is becoming more desirable to be able to roam between access technologies. In particular, several mobile manufacturers have publicized intentions of manufacturing multi-band, multi-protocol mobiles that could potentially communicate with CDMA2000, GPRS/UMTS and 802.11 networks. However, there currently is no architecture or standard for inter-technology roaming.

The present invention fills this void in inter-technology roaming by providing a system and method that allows seamless roaming between wireless networks using CDMA, GSM, and/or wireless Ethernet (802.11). The details of the present invention are set forth below.

SUMMARY OF THE INVENTION

The present application provides a method for roaming between a mobile node and at least one serving node connected to a network. The method comprises the step of establishing a first communication between the mobile node and one of the serving nodes through a control server, when an Ethernet transceiver is used by the mobile node. The method further comprises the step of using Ethernet for communications between the mobile node and the control server, and a wireless communication technology for communications between the control server and the serving node. The method also comprises the step of translating communications between Ethernet and the wireless communication technology with the control server, and establishing a second communication between the mobile node and one of the serving nodes with the wireless communication technology, when a wireless communication technology transceiver is used by the mobile node.

The present application also provides another method for roaming between a mobile node and at least one serving node connected to a network. This method comprises the steps of establishing a first communication between the mobile node and one of the serving nodes through a control server, when a wireless Ethernet transceiver is used by the mobile node, and bridging communications between the mobile node and the control server with an access point. In addition, the method comprises the step of using wireless Ethernet for communications between the mobile node and the access point, wireline Ethernet for communications between the access point and the control server, and a wireless communication technology for communications between the control server and the serving node. The method further comprises the step of translating communications between Ethernet and the wireless communication technology with the control server. Also, the method comprises the steps of establishing a second communication between the mobile node and one of the serving nodes through an interface node, when a wireless communication technology transceiver is used by the mobile node, and using the wireless communication technology for communications between the mobile node, the interface node, and the serving node.

Moreover, the present application provides a device for controlling communications between a mobile node and at least one serving node. The device comprises a first interface to transmit communications to and receive communications from the mobile node using Ethernet, and a second interface to transmit communications to and receive communications from the at least one serving node using a wireless communication technology. In this device, signaling associated with the communications of the first and second interfaces is translated between Ethernet and the wireless communication technology.

In addition, the present application provides a system for roaming between a mobile node and at least one serving node. The system comprises a serving node connected to a network, a mobile node having a wireless Ethernet transceiver and a wireless communication technology transceiver to communicate with the serving node, and a control server having a first interface to communicate with the mobile node and a second interface to communicate with the serving node. In this system, Ethernet is used for communications between the mobile node and the first interface of the control server, the wireless communication technology is used for communications between the second interface of the control server and the serving node, and the control server translates signaling associated with communications between Ethernet and the wireless communication technology.

DETAILED DESCRIPTION OF EXEMPLARY EMBODIMENTS

Figure 1:
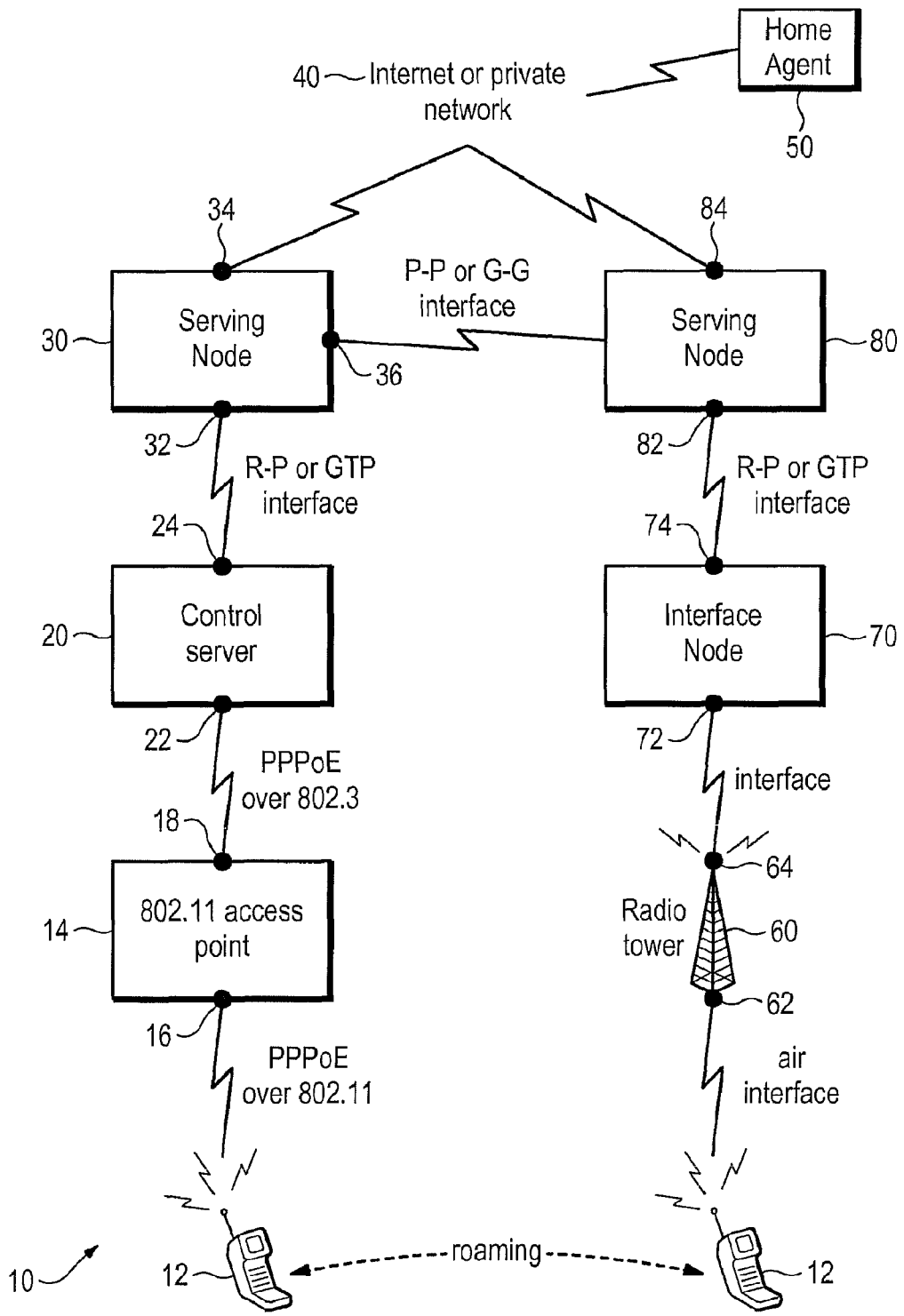
FIG. 1 is a block diagram illustrating an exemplary system and method of the present invention for roaming between wireless networks with two serving nodes.

FIG. 1 shows an exemplary embodiment of a system 10 and method for roaming between wireless networks. The system 10 comprises a mobile node 12, an access point 14, a control server 20, a first serving node 30 (e.g., PDSN or GGSN) in communication with a network 40 (e.g., the Internet or a private network), a home agent (HA) 50, a radio tower 60, an interface node 70 (e.g., PCF or SGSN), and a second serving node 80 (e.g., PDSN or GGSN) in communication with the network 40 and the first serving node 30. As shown in FIG. 1, the mobile node 12 preferably communicates with the access point 14 using a PPP over wireless Ethernet (802.11) link, the access point 14 preferably communicates with the control server 20 using a PPP over wireline Ethernet (802.3) link, and the control server 20 preferably communicates with the first serving node 30 using a wireline link, such as a radio access network to packet data serving node (R-P) interface link or a GPRS Tunneling Protocol (GTP) interface link. As also shown in FIG. 1, the mobile node 12 may communicate with the radio tower 60 using a wireless link (e.g., a CDMA2000 air link or corresponding GSM air link), the radio tower 60 may communicate with the interface node 70 using another wireless link (e.g., an A8/A9 interface link or corresponding GSM interface link), and the interface node 70 may communicate with the second serving node 80 using a wireline link, such as an R-P or GTP interface link.

In the system 10, the mobile node 12 uses wireless Ethernet (i.e., IEEE 802.11) to communicate with the access point 14, which in turn transparently bridges the wireless Ethernet communication to a wireline Ethernet communication with the control server 20. For purposes of the present application, a reference to wireless Ethernet includes IEEE 802.11, a reference to wireline Ethernet includes TREE 802.3, and a reference to just Ethernet includes both wireless and wireline Ethernet. After receiving the wireline Ethernet communication, the control server 20 translates the communication from Ethernet to a wireless communication technology, such as CDMA or GSM, and communicates with the first serving node 30 using the wireless communication technology. It should be understood that for purposes of the present application, although wireless Ethernet may be defined as a wireless communication technology, reference to a wireless communication technology herein is reserved for cellular technology such as CDMA or GSM (including all of their standard communication protocols).

Next, the first serving node 30 may communicate with the HA 50 across the network 40 (e.g., the Internet). Alternatively, the first serving node 30 may transfer its communication to the second serving node 80 via a serving node to serving node interface link (e.g., a P-P interface link or corresponding GSM interface link). Communication from the HA 50 to the mobile node 12 via the first serving node 30 flows in a similar, albeit reverse, manner.

The mobile node 12 may also roam and use the wireless communication technology (e.g., CDMA or GSM) to communicate with the radio tower 60. The radio tower 60 then communicates with the interface node 70, which in turn communicates with the second serving node 80, in accordance to the wireless communication technology. Next, the second serving node 80 may communicate with the HA 50 across the network 40, or alternatively, may transfer its communication to the first serving node 30. Again, communication from the HA 50 to the mobile node 12 via the second serving node 80 flows in a similar, albeit reverse, manner.

Figure 2:
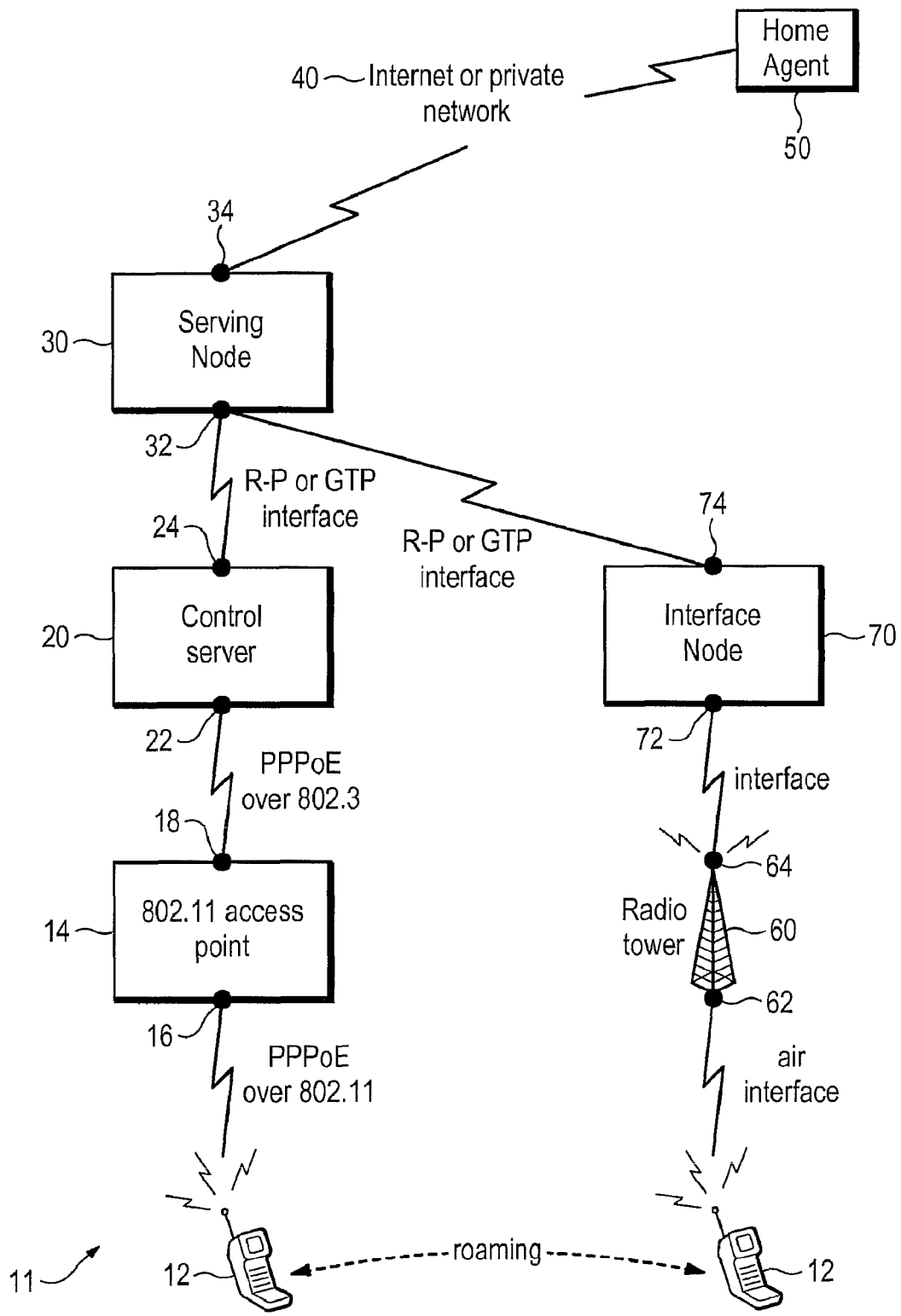
FIG. 2 is a block diagram illustrating an exemplary system and method of the present invention for roaming between wireless networks with one serving node.

FIG. 2 shows another exemplary embodiment of a system 11 and method for roaming between wireless networks. The system 11 is identical to the system 10, except that there is no second serving node 80. As a result, in the system 11, the interface node 70 communicates with the first serving node 30 instead of the second node 80. Other than this difference, the system 11 also operates in the same manner as the system 10.

The exemplary systems 10, 11 shown in FIGS. 1-2 allows roaming between a wireless Ethernet network and another wireless network that uses a wireless communication technology, such as CDMA or GSM, using the same mobile node. This roaming is accomplished in part by the control server, which translates Ethernet communications into wireless communication technologies, such as CDMA or GSM. As a result of this roaming capability, the exemplary systems 10, 11 of the present invention enable a mobile node to have the best of both worlds—access to a relatively high bandwidth technology like wireless Ethernet, and an existing mobile technology like CDMA or GSM.

Below is a general description of wireless Ethernet and the CDMA and GSM wireless communication technologies, as well as a more detailed description of some of the individual components of the exemplary systems 10, 11 shown in FIGS. 1-2.

Wireless Ethernet

Wireless Ethernet (IEEE 802.11) is a popular wireless access technology that allows Ethernet-like media framing over the 2.4 GHz wireless spectrum. Like wireline Ethernet (IEEE 802.3), there is no admission control and carrier sense multiple access (CSMA) is used. However, where wireline Ethernet uses collision detection (CD), wireless Ethernet (also referred to herein as 802.11), uses collision avoidance (CA). For more information on wireless Ethernet, see IEEE 802.11, specifically incorporated herein by reference.

Wireless Ethernet (802.11) networks can be transparently bridged to wireline Ethernet (802.3) networks. Wireless Ethernet (802.11) packets use the same format as wireline Ethernet (802.3) packets, and can be passed from the wireless to wireline setting via an 802.11 access point.

CDMA

Code Division Multiple Access (CDMA) is wireless communication system for a popular digital, spread spectrum, cellular phone service. The CDMA protocol family includes not only CDMA, but also cdmaOne and CDMA2000. Unless otherwise stated to the contrary, for purposes of the present application, a reference to CDMA includes the cdmaOne and CDMA2000 wireless communication technologies (including all of their standard communication protocols), as well as any future wireless communication technologies based on CDMA2000. See the CDMA standards (e.g., TIA/EIA IS-2000 series) published by the Telecommunications Industry Association (TIA) for more information on CDMA technology, communication protocols, and components. It should also be understood that unless stated to the contrary, standard CDMA components are used with the present invention.

CDMA is a suite of air link, radio network, and Internet Protocol (IP) standards that allow IP network access by cellular devices (i.e., mobile nodes). The mobile node (e.g., mobile node 12) gains network access by negotiating with a radio tower (e.g., radio tower 60) or base station for an air link channel. Once an air link channel is allocated, the radio tower or base station (or more precisely its associated controller) uses an A8/A9 interface to set up a packet data session with a Packet Control Function ("PCF") node (e.g., interface node 70). The PCF likewise uses an R-P interface (also known as an A10/A11 interface) to set up a packet data session with a PDSN (e.g., serving nodes 30, 80).

In CDMA, a Point-to-Point Protocol (PPP) session is then initiated by the cellular device or mobile node and terminated at the PDSN. IP traffic is carried over the PPP session and transferred between the mobile node and the PDSN. The PDSN is also responsible for relaying IP traffic to an IP network, such as the Internet. For more information on PPP, see Internet Engineering Task Force (IETF) Requests For Comments (RFC) 1661, specifically incorporated herein by reference.

GSM

Global System for Mobile Communications (GSM) is a wireless communication system for another popular digital phone service. The GSM protocol family includes not only GSM, but also General Packet Radio Service (GPRS) and Universal Mobile Telecommunications System (UMTS). Unless otherwise stated to the contrary, for purposes of the present application, a reference to GSM includes GPRS/UMTS (including all of their standard communication protocols), as well as any future wireless communication technologies based on GPRS/UMTS. See the GSM standards published by the European Telecommunications Standards Institute (ETSI) for more information on GSM technology, communication protocols, and components. It should also be understood that unless stated to the contrary, standard GSM components are used with the present invention.

Despite their technological differences, GSM and CDMA work in a similar fashion. Instead of a PDSN and a PCF, GSM uses a Gateway GPRS Support Node (GGSN) and a Serving GPRS Support Node (SGSN), respectively. Also, rather than an R-P interface, GSM uses a GPRS Tunneling Protocol (GTP) interface.

Although GSM is a suitable wireless communication technology for use with the systems and methods of the present invention, this application focuses on CDMA for the wireless communication technology to describe the exemplary embodiments set forth herein. It should be understood that, unless specifically stated to the contrary, GSM technology and its components may be readily substituted for CDMA technology and its components in connection with the present invention. To avoid unnecessary repetition and redundancy, however, only CDMA examples are illustrated in the drawings and described in any detail in the present application.

PPP Over Ethernet

PPP over Ethernet (PPPoE) allows two devices on the same Ethernet (or wireless Ethernet) network to establish a PPP link. Establishment of the PPP session involves four messages: (1) a PPPoE Active Discovery Initiation (PADI) message; (2) a PPPoE Active Discovery Offer ("PADO") response message; (3) a PPPoE Active Discovery Request ("PADR") message; and (4) a PPPoE Active Discovery Session-confirmation ("PADS") message. These messages are preferably encapsulated in Ethernet frames, and no IP connectivity is required. Although not shown or discussed in detail herein, PPPoE frames may also include optional vendor specific attributes that are implemented as tags. For more information on PPPoE, see IETF RFC 2516, specifically incorporated herein by reference.

The above four messages are used by the mobile node 12 and the control server 20 in the following manner. The initiator (e.g., the mobile node 12) broadcasts a PADI message. If there are no control servers 20 on the same network segment as the initiator, there will be no response. The initiator may retry a number of times before giving up. If there are one or more control servers on the same network segment, however, the initiator (e.g., mobile node 12) may receive one or more PADO response messages, each containing the Medium Access Control (MAC) address of a control server 20. The initiator will pick a control server and send a PADR message to initiate a PPP session. If the session is accepted, the control server will respond with a PADS message. At this point, the initiator and the control server may negotiate PPP, then establish a data session over the PPP link. Finally, The PPP session may be terminated by either side with a PPPoE Active Discovery Terminate ("PADT") message.

Mobile Node

The mobile node 12 comprises an Ethernet transceiver and a wireless communication technology transceiver to communicate with one of the serving nodes 30. When CDMA is used for the wireless communication technology, the mobile node 12 is preferably a standard CDMA2000 1xRTT and/or 1xEVDO mobile phone with one modification—in addition to the CDMA transceiver, the CDMA mobile node 12 preferably also contains an 802.11 transceiver and a PPPoE stack. Similarly, if GSM were used for the wireless communication technology, then a standard GSM mobile phone may be used in place of the standard CDMA mobile phone. Such a standard GSM mobile phone, however, would have to be similarly modified—in addition to the GSM transceiver, the GSM mobile node 12 would also contains an 802.11 transceiver and a PPPoE stack.

When receiving a signal on the CDMA transceiver from the CDMA air interface, the mobile node 12 may establish a CDMA data session. When receiving a signal on the 802.11 transceiver, the mobile node 12 may establish an 802.11 data session. When the mobile node receives signal on both interfaces, it may establish a data session using either access technology. Whether the mobile prefers to use one access technology over another depends on manufacturing, system, and/or user preferences, as well as the type of information being communicated (e.g., voice or data). As described in more detail below, the mobile node may also terminate a session by tearing down a PPPoE session.

While connected to the radio tower of the CDMA network, the mobile node may send sends PPP frames with High Level Data Link Control (HDLC) framing. This is preferably done, in part, so that the HDLC frames can be broken up to fit into slots on the CDMA interface. On the 802.11 network, however, the mobile node will also send PPP frames with HDLC framing, but will not segment the frames. In other words, each PPPoE frame will contain exactly one full PPP frame. For more info ration on HDLC framing, see IETF RFC 1662, specifically incorporated herein by reference.

Access Point

The access point 14 bridges an 802.11 wireless network with an Ethernet network. Preferably, the access point 14 has a first interface 16, such as a wireless Ethernet interface, for establishing an 802.11 interface link between the mobile node 12 and the access point 14. The access point 14 preferably also has a second interface 18, such as a wireline Ethernet (i.e., 802.3) interface, for establishing a wireline Ethernet interface link between the access point 14 and the control server 20. The use of PPPoE is preferably transparent to the access point. For purposes of the present application, the access point is a stock component and no modifications are necessary. An exemplary access point 14 for use in the present embodiment may be the Wireless Access Point 8000, which is commercially available from the present assignee, 3COM Corporation.

Control Server

The control server 20 comprises a first interface 22, such as a wireline PPPoE interface, for enabling a wireline PPPoE interface link between the control server 20 and the second interface 18 of the access point 14. The control server 20 also comprises a second interface 24, such as an R-P interface, for enabling an R-P interface link (or a corresponding GSM interface link, such as a GTP interface link) between the control server 20 and the first serving node 30. The control server 20 acts like a standard PPPoE server for signaling purposes, but does not serve as a PPP endpoint. Instead, it relays the PPP session to a serving node, such as a PDSN. As shown in FIGS. 1-2, the control server 20 may therefore be referred to as a modified PPPoE server.

The control server 20 also serves as a signaling translator, allowing PPPoE signaling on one side and R-P signaling (or GTP signaling) on the other. In other words, communications that enter the control server using Ethernet, exit the control server using a communication protocol (e.g., R-P interface protocol or GTP interface protocol) from a wireless communication technology (e.g., CDMA or GSM), and vice-versa. Put another way, this arrangement allows the control server to translate the signaling associated with the PPPoE communication into the signaling associated with the communication protocol (e.g., R-P interface protocol or GTP interface protocol), and vice-versa. The result is that the control server, in effect, mimics an interface node 70 (e.g., a PCF or SGSN) to the first serving node 30 (e.g., a PDSN or GGSN).

The control server operates in the following manner. When the control server receives a PADR message from the mobile node, it sends an R-P Registration Request (RRQ) to the first serving node (e.g., PDSN). If the first serving node sends an R-P Registration Reply (RRP) that indicates successful session establishment, the control server sends a PADS message to the mobile node via the PPPoE links. Similarly, the control server will coordinate the graceful tear down of PPP data sessions between the mobile and the PDSN. Although the PPPoE specification recommends terminating the PPP session via the Link Control Protocol (LCP), rather than tearing down the PPP session with a PADT message, the latter may be preferable, or even necessary, in some situations, such as when the R-P interface between the control server and the first serving node times out.

It should be understood that the control server is a logical component that is preferably deployed as a separate physical component (FIGS. 1-2), but may alternatively be integrated into either the 802.11 access point 14 or the first serving node 30 (e.g., PDSN). One advantage of keeping the control server as a separate physical component is that it should only be one (possibly bridged) LAN segment from the mobile node. Thus, if the access point resides on customer premises, but the first serving node (e.g., PDSN) resides on the service provider's premises, there may be an IP or ATM backhaul between the two networks. In this situation, it would be difficult to integrate the control server with the first serving node (e.g., PDSN).

The control server may select a serving node (e.g., PDSN) using the standard serving node selection algorithms for the selected wireless communication technology (e.g., CDMA or GSM), or the control server may be hard-coded to always establish sessions with a particular serving node (e.g., the first serving node 30). In addition, the control server may perform admission control on the 802.11 network and the mobile nodes accessing the control server through the 802.11 access point. In other words, the control server may keep track of the number of sessions established on the 802.11 network, and determine that new sessions cannot be admitted.

Serving Nodes

The first serving node 30 comprises a first interface 32, such as an R-P interface, for enabling an R-P interface link (or a corresponding GTP interface link) between the first serving node 30 and the second interface 24 of the control server 20. The first serving node 30 further comprises a second interface 34 for enabling an IP network link between the first serving node 30 and the HA 50 via the network 40 (e.g., the Internet). The first serving node 30 also preferably, but not necessarily, comprises a third interface 36, such as a P-P interface (PDSN to PDSN interface), for enabling a P-P interface link between the first and second serving nodes 30, 80.

With the exception of its location and its interfaced components, the second serving node 80 is preferably identical to the first serving node 30. As shown in FIGS. 1-2, the second serving node 80 comprises a first interface 82, such as an R-P interface, for enabling an R-P interface link (or a corresponding GTP interface link) between the second serving node 80 and the interface node 70. The second serving node 80 also comprises a second interface 84 for enabling an IP network link between the second serving node 80 and the HA 50 via the network 40 (e.g., the Internet). The second serving node 80 further comprises a third interface 86, such as a P-P interface (PDSN to PDSN interface), for enabling a P-P interface link between the second serving node 80 and the third interface 36 of the first serving node 30.

The functionality of the serving nodes will now be described. For ease of reference, only the functionality of a PDSN (i.e., the CDMA version of the serving node) will be described herein. It should be understood, however, that instead of a PDSN for the first and second serving nodes, a GGSN may be used when GSM is the chosen wireless communication technology. Regardless of the type of serving nodes used, for purposes of the present invention, the first and second serving nodes function in the same manner as the PDSN discussed below.

The PDSN terminates the PPP session with the mobile node and relays the mobile node's IP packets to the IP network. All of the communications by the PDSN use the wireless communication technology (e.g., CDMA) and Internet communication protocols (e.g., IP). The PDSN serves as an access concentrator, Mobile IP foreign agent, and Remote Authentication Dial-In User Service (RADIUS) client. For more information on PDSNs, GGSNs, and other serving nodes, see U.S. patent application Ser. No. 10/186,957, entitled "System And Method For A Universal Wireless Access Gateway," filed Jul. 1, 2002, which is specifically incorporated in its entirety herein by reference.

In the embodiment illustrated in FIG. 1, in which both PDSNs have the P-P capability, a tunnel is initially established between the new PDSN and the old PDSN, and the mobile may wait until the user is idle to re-register with the HA 50 to identify the new PDSN. In such an embodiment, the P-P interface may remain active until the services of the mobile node becomes dormant. When the services become inactive, the air link channels are transferred to the new radio node ("RN"), and the new RN may signal the new PDSN to negotiate PPP with the mobile. Once the PPP session is established between the mobile node and the new PDSN, the P-P interface to the old PDSN may be torn down.

FIG. 2 shows the same network as FIG. 1, but with only a single serving node (e.g., PDSN). The functions of each component in the network is identical to those of the two PDSN scenario, except that the P-P interface is not needed as long as the mobile node is associated with the same PDSN.

For purposes of this application, the PDSN is preferably, but not necessarily, a stock component and no modifications are necessary. An exemplary PDSN for use in the present embodiment may be the Total Control 1000 PDSN, which is commercially available from the present assignee, 3COM Corporation. Optionally, however, both PDSNs may be modified to return the PDSN's public IP address to the mobile node. As explained in more detail below, this can be used by the mobile during a handoff to notify the new PDSN of the address with which to set up a P-P (PDSN-to-PDSN) session.

HA, Radio Tower, and Interface Node

Although not shown, the radio tower 60, also known as a base station, preferably includes a base station controller. The radio tower 60 also preferably has a first interface 62, such as a CDMA or GSM air interface, for enabling a wireless communication technology (e.g., CDMA or GSM) air link between the radio tower 60 and the mobile node 12. Moreover, the radio tower 60 (or more precisely its associated base station controller) preferably has a second interface 64, such as an A8/A9 interface (or corresponding GSM interface), for enabling a wireline link between the radio tower 60 and the interface node 70. Similarly, the interface node 70 has a first interface, such as an A8/A9 interface (or corresponding GSM interface), for enabling a wireline link between the interface node 70 and the second interface 64 of the radio tower 60. In addition, the interface node 70 has a second interface 74, such as an R-P interface, for enabling an R-P interface link (or a corresponding GTP interface link for GSM) between the interface node 70 and the first interface 82 of the second serving node 80.

The HA 50, the radio tower 60 and the interface node 70 are all well known standard components for use with wireless communication technologies such as CDMA and GSM. Consequently, these components will not be described in any more detail in the present application.

Call Flows

The operation of the systems 10, 11 and the method of the present invention will now be described through several different exemplary call flow scenarios. It should be understood, however, that only the call flows involving Ethernet (i.e., the left sides of FIGS. 1-2) will be described in detail below. For purposes of the present application, the call flows involving only the wireless communication technologies, such as CDMA and GSM (i.e., the right sides of FIGS. 1-2) are standard calls fully known and described in the specifications for the wireless communication technologies.

Session Establishment for Wireless Ethernet Access

Figure 3:
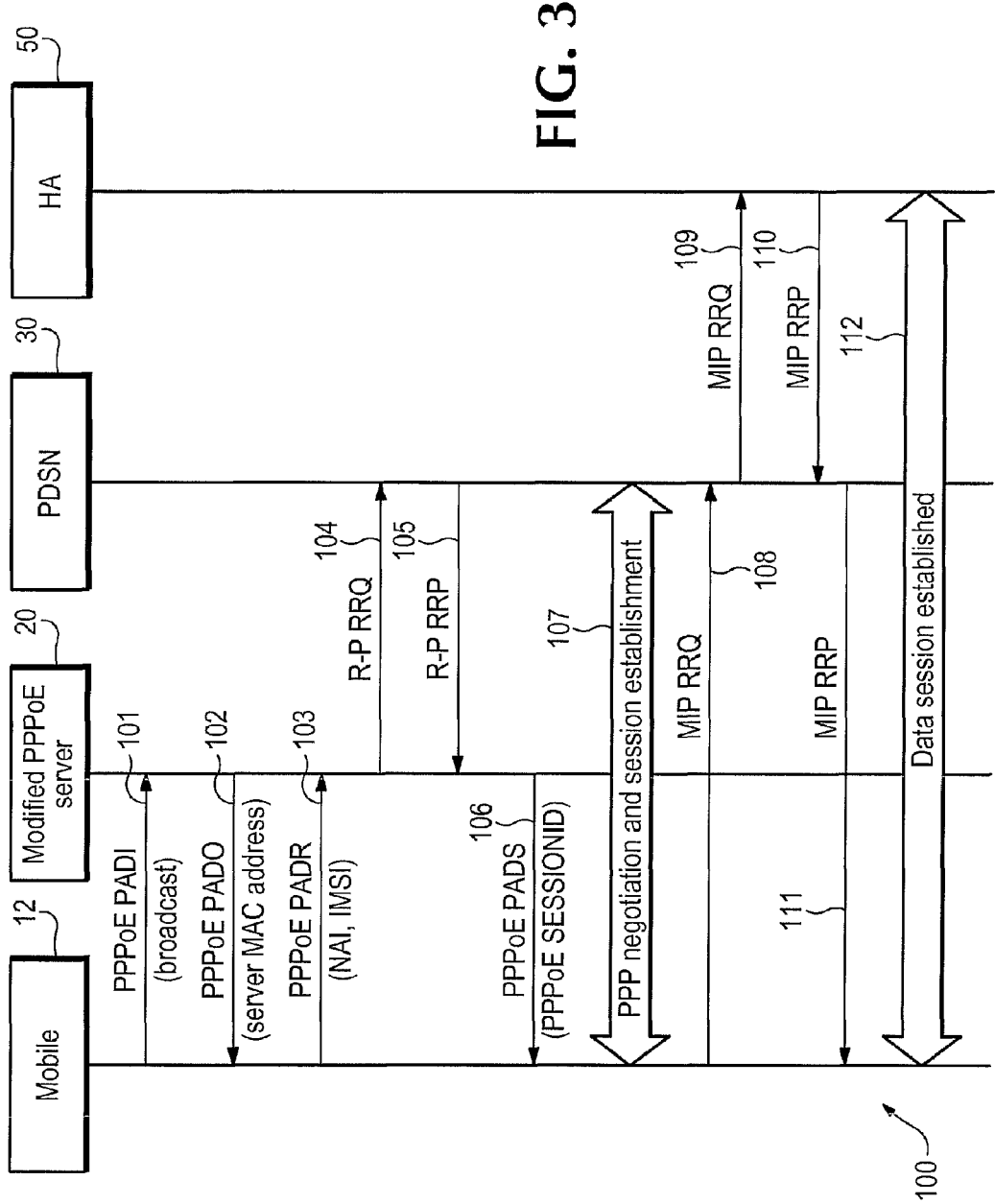
FIG. 3 is a flow diagram illustrating a session establishment for the system and method of FIGS. 1-2.

FIG. 3 shows a method 100 for establishing a data session in the systems 10, 11. More specifically, FIG. 3 illustrates the establishment of a data session using the wireless Ethernet (802.11) side of the systems 10, 11 (i.e., the 802.11 network). For ease of reference, the method 100 is shown in FIG. 3 and will described herein as if CDMA was the wireless communication technology chosen for the systems 10, 11. It should be understood, however, that GSM may be chosen as the wireless communication technology instead, with the corresponding GSM components and links replacing those of CDMA.

Initially, in the method 100, the mobile node detects an 802.11 signal and determines that 802.11 network access is desirable. The determination to access the 802.11 network, as opposed to the other wireless communication technology network (e.g., CDMA or GSM network), may depend on manufacturer, user, system, and/or network preferences.

The mobile node then broadcasts a PPPoE PADI message in step 101. Zero or more control servers may receive the PADI message. In response to the PADI, a control server may send a PPPoE PADO message containing its MAC address back to the mobile node (step 102). In step 103, the mobile sends back a PPPoE PADR message. As shown in FIG. 3, the PADR message may optionally contain the mobile node's Network Access Identifier ("NAI") and its International Mobile Subscriber Identity ("IMSI") as PPPoE tags.

Next, the control server sends an R-P (A11) Registration Request (RRQ) to the serving node (e.g., PDSN) in step 104. If the PDSN accepts the R-P session, it responds with an R-P (A11) Registration Reply (RRP) in step 105. Upon receiving the R-P RRP, the control server sends a PPPoE PADS message in step 106, confirming the allowance of a PPP session between the mobile node and the PDSN.

In step 107, PPP is negotiated between the mobile node and the PDSN according to the standard CDMA protocols for such negotiation. Once PPP is established, the mobile node may establish a simple IP session and then access the IP network (i.e., the network 40). Alternatively, the mobile node may establish a mobile IP (MIP) session to the HA. This may be accomplished with the following four steps: (1) an MIP RRQ is sent from the mobile node to the PDSN (step 108); (2) the MIP RRQ is sent from the PDSN to the HA (step 109); (3) an MIP RRP is sent from the HA to the PDSN (step 110); and (4) the MIP RRP is sent from the PDSN to the mobile node (step 111). After the MIP session is established, a data session is established between the mobile node and the HA in step 112. For more information on MIP, see IETF RFCs 2002-06, all of which are specifically incorporated herein by reference.

Session Establishment for Wireless Ethernet Access with P-P Signaling

Figure 4:
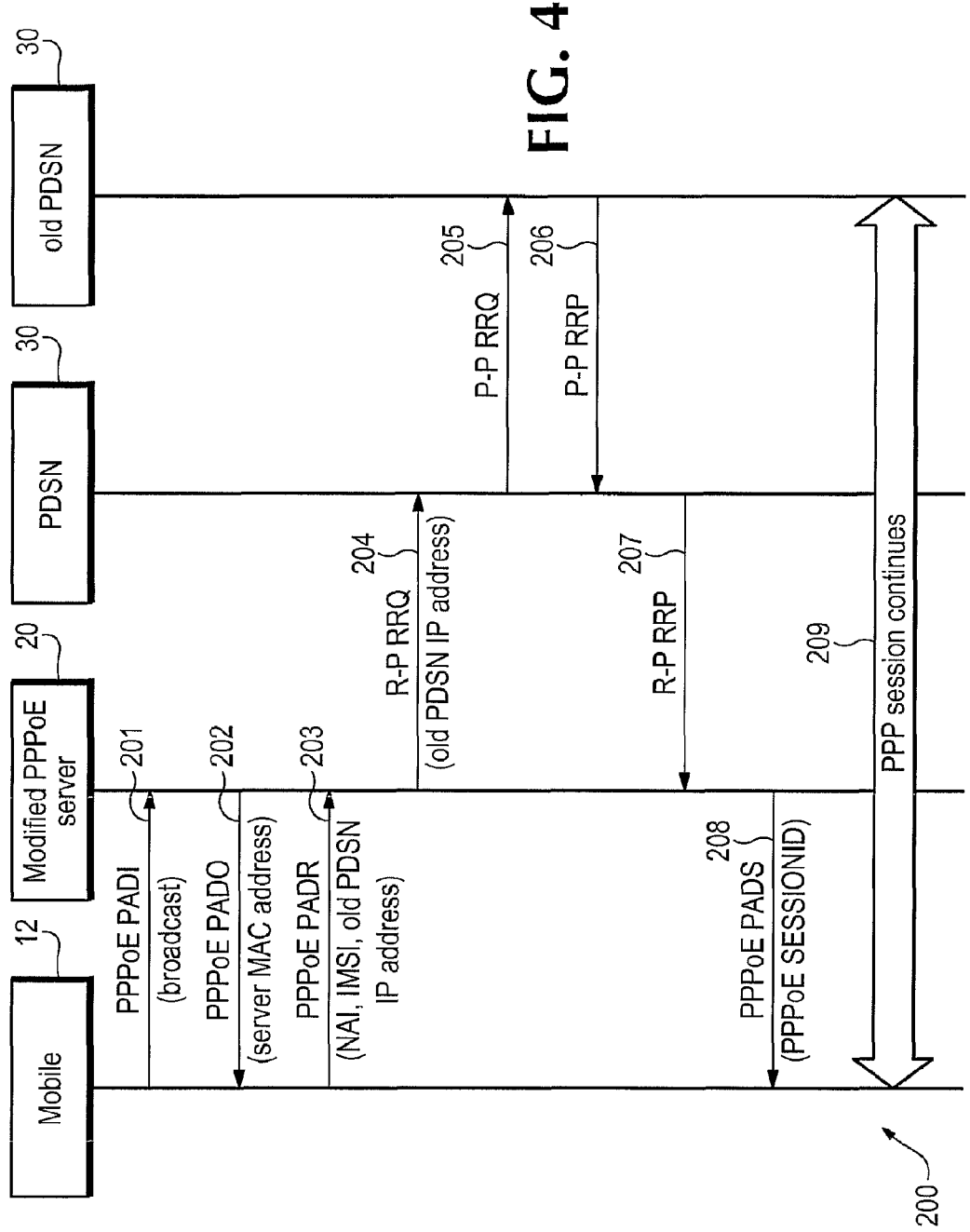
FIG. 4 is a flow diagram illustrating a session establishment with serving node signaling for the system and method of FIG. 1.

FIG. 4 shows a method 200 for establishing a data session using the wireless Ethernet (802.11) side of the systems 10, 11 (i.e., the 802.11 network) together with serving node-serving node (e.g., P-P) signaling. Again, for ease of reference, the method 200 is shown in FIG. 4 and will described herein as if CDMA was the wireless communication technology chosen for the systems 10, 11. It should be understood, however, that GSM may be chosen as the wireless communication technology instead, with the corresponding GSM components and links replacing those of CDMA.

In the method 200, the mobile node initially has connectivity on the CDMA network, and has been notified of the PDSN's public IP address. Next, the mobile node detects an 802.11 signal and determines that 802.11 network access is desirable. As shown in FIG. 4, the mobile node then broadcasts a PPPoE PADI message (step 201). Zero or more PPPoE servers may receive this message. In step 202, a control server may respond to the PADI with a PPPoE PADO message containing its MAC address.

The mobile node, in step 203, then sends a PPPoE PADR message that may optionally contain its NAI and its IMSI as PPPoE tags. As shown in FIG. 4, the mobile node also includes the old PDSN's (i.e., the PDSN used for the previous CDMA connection) public IP address in the PADR message (step 203). In step 204, the control server sends an R-P RRQ to the PDSN including the old PDSN's public IP address. Next, the PDSN sends a PDSN-PDSN (P-P) RRQ to the old PDSN's IP address in step 205. If the old PDSN accepts the P-P session, it responds with a P-P RRP (step 206).

In step 207, the PDSN sends the control server an R-P RRP. Upon receiving the R-P RRP, the control server sends a PPPoE PADS message in step 208, confirming the allowance of a PPP session between the mobile node and the PDSN via the control server. Finally, in step 209, the previous CDMA PPP session continues where it left off using the wireless Ethernet (802.11) network.

Mobile Node Initiated Session Teardown Using LCP Terminate

Figure 5:
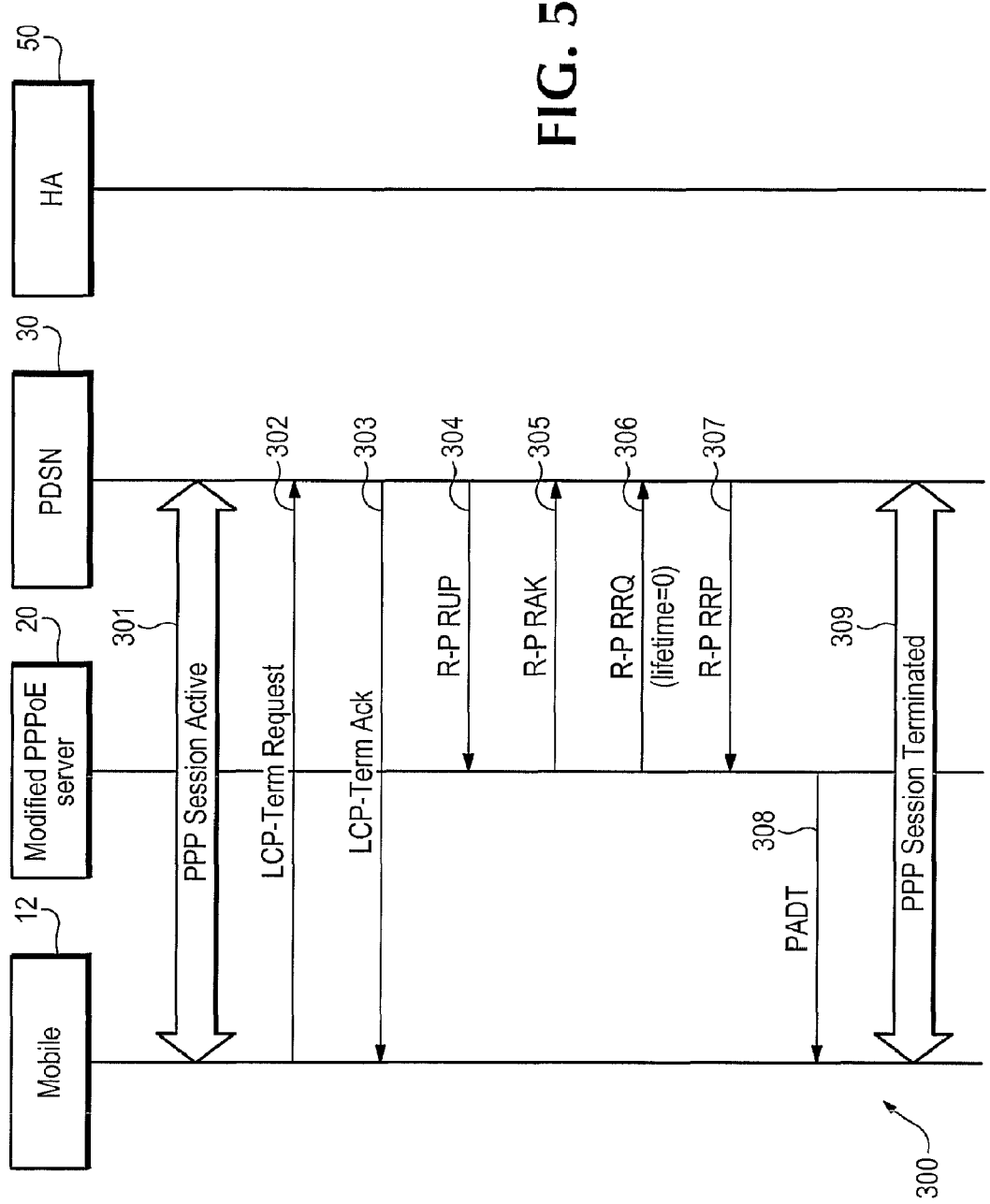
FIG. 5 is a flow diagram illustrating a mobile initiated session teardown using LCP terminate for the system and method of FIGS. 1-2.

FIG. 5 shows a method 300 for a mobile node initiated session teardown using a Link Control Protocol (LCP) terminate message. Once again, for ease of reference, the method 300 is shown in FIG. 5 and will described herein as if CDMA was the wireless communication technology chosen. It should be understood, however, that GSM may be chosen as the wireless communication technology instead, with the corresponding GSM components and links replacing those of CDMA.

In the method 300, a PPP session initially exists between the mobile node and the PDSN (represented by reference numeral 301 in FIG. 5). In step 302, the mobile node may opt to disconnect the session by sending an LCP Terminate Request (LCP-Term Request) message to the PDSN through the control server. The PDSN then performs steps to disconnect the PPP context.

In step 303, the PDSN responds to the LCP-Term Request with an LCP Terminate Acknowledge (LCP-Term Ack) message. The PDSN also send the control server an R-P Registration Update (RUP) message in step 304. In response, the control server sends back an R-P Registration Acknowledgement (RAK) message to the PDSN in step 305.

Next, in step 306, the control server sends the PDSN an R-P RRQ with a lifetime value of zero to indicate a de-registration request. Upon accepting this de-registration request, the PDSN responds in step 307 with an R-P RRP. In addition, the control server may optionally send a PADT message to the mobile node (step 308), as shown by the dashed line in FIG. 5. At this point, all PPP contexts have been removed, and no active PPP session exists (step 309) between the mobile node and the PDSN (call clearing is complete).

Mobile Node Initiated Session Teardown Using PADT Terminate

Figure 6:
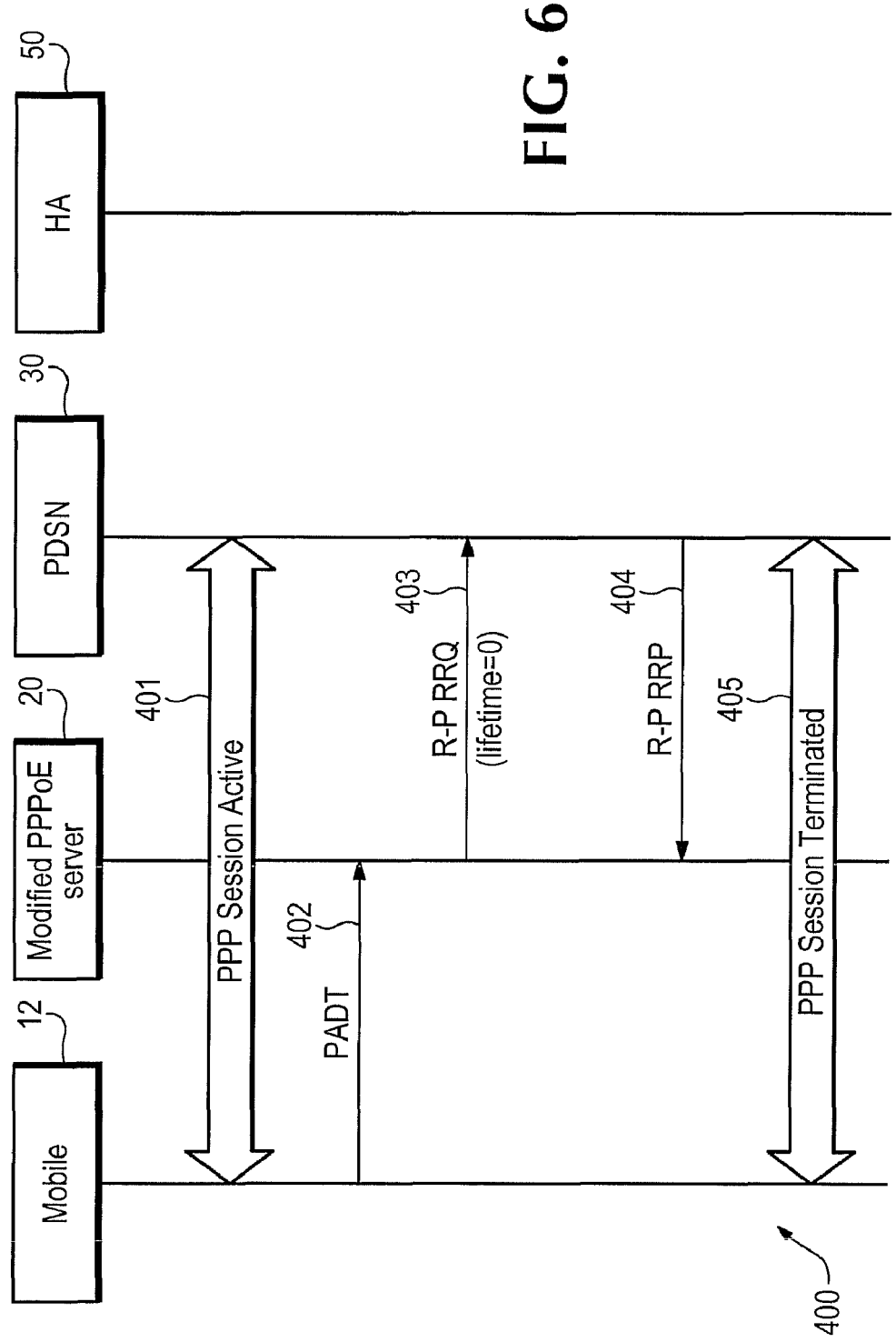
FIG. 6 is a flow diagram illustrating a mobile initiated session teardown using PPPoE active terminate for the system and method of FIGS. 1-2.

FIG. 6 shows a method 400 for a mobile node initiated session teardown using a PADT message. As with the method 300, for ease of reference, the method 400 is shown in FIG. 6 and will described herein as if CDMA was the wireless communication technology chosen. But, it should be understood that GSM may be chosen as the wireless communication technology instead, with the corresponding GSM components and links replacing those of CDMA.

In the method 400, a PPP session initially exists between the mobile node and the PDSN (represented by reference numeral 401 in FIG. 6). In step 402, the mobile node may opt to disconnect the session by sending a PADT message, instead of an LCP-Term Request, to the control server. The control server receives the PADT message, and performs de-registration with the PDSN. This de-registration process is initiated by the control server sending an R-P RRQ with a lifetime value of zero to the PDSN (step 403).

In step 404, the PDSN responds to the R-P RRQ from the control server with an R-P RRP message. Although not shown, the PDSN also clears all PPP contexts for the user. At this point, all PPP contexts have been removed, and no active PPP session exists (step 405) between the mobile node and the PDSN (call clearing is complete).

Serving Node Initiated Session Teardown

Figure 7:
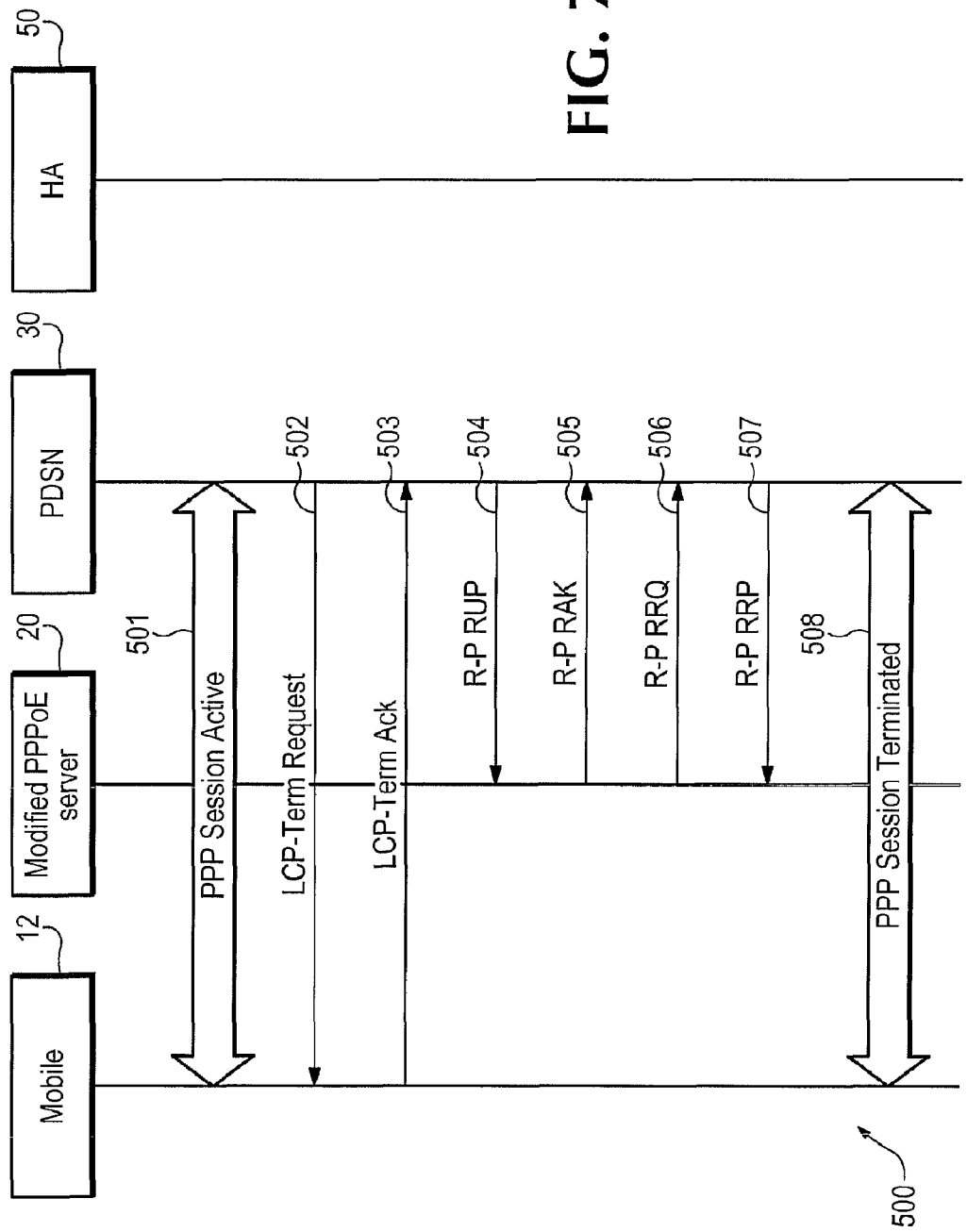
FIG. 7 is a flow diagram illustrating a serving node initiated session teardown for the system and method of FIGS. 1-2.

FIG. 7 shows a method 500 for a PDSN initiated session teardown. As with the previous methods, for ease of reference, the method 500 is shown in FIG. 7 and will described herein as if CDMA was the wireless communication technology chosen. It should be understood, however, that GSM may be chosen as the wireless communication technology instead, with the corresponding GSM components and links replacing those of CDMA.

In the method 500, a PPP session initially exists between the mobile node and the PDSN (represented by reference numeral 501 in FIG. 7). The PDSN may then choose to tear down the PPP session. This may occur as a result of the PPP Session Timer expiring. There may also be other reasons for the PDSN to initiate a session teardown. For example, the R-P lifetime timer may expire, the PPP idle timer may expire, or a manual disconnect may be desirable.

To initiate the session teardown, the PDSN may send an LCP Terminate Request (LCP-Term Request) message in step 502 to the mobile node through the control server. In step 503, the mobile node responds to the LCP-Term Request with an LCP Terminate Acknowledge (LCP-Term Ack) message. The PDSN also send the control server an R-P Registration Update (RUP) message in step 504. In response, the control server sends back an R-P Registration Acknowledgement (RAK) message to the PDSN in step 505.

Next, in step 506, the control server sends the PDSN an R-P RRQ with a lifetime value of zero to indicate a de-registration request. Upon accepting this de-registration request, the PDSN responds in step 507 with an R-P RRP. At this point, all PPP contexts have been removed, and no active PPP session exists (step 508) between the mobile node and the PDSN (call clearing is complete).

Control Server Initiated Session Teardown

Figure 8:
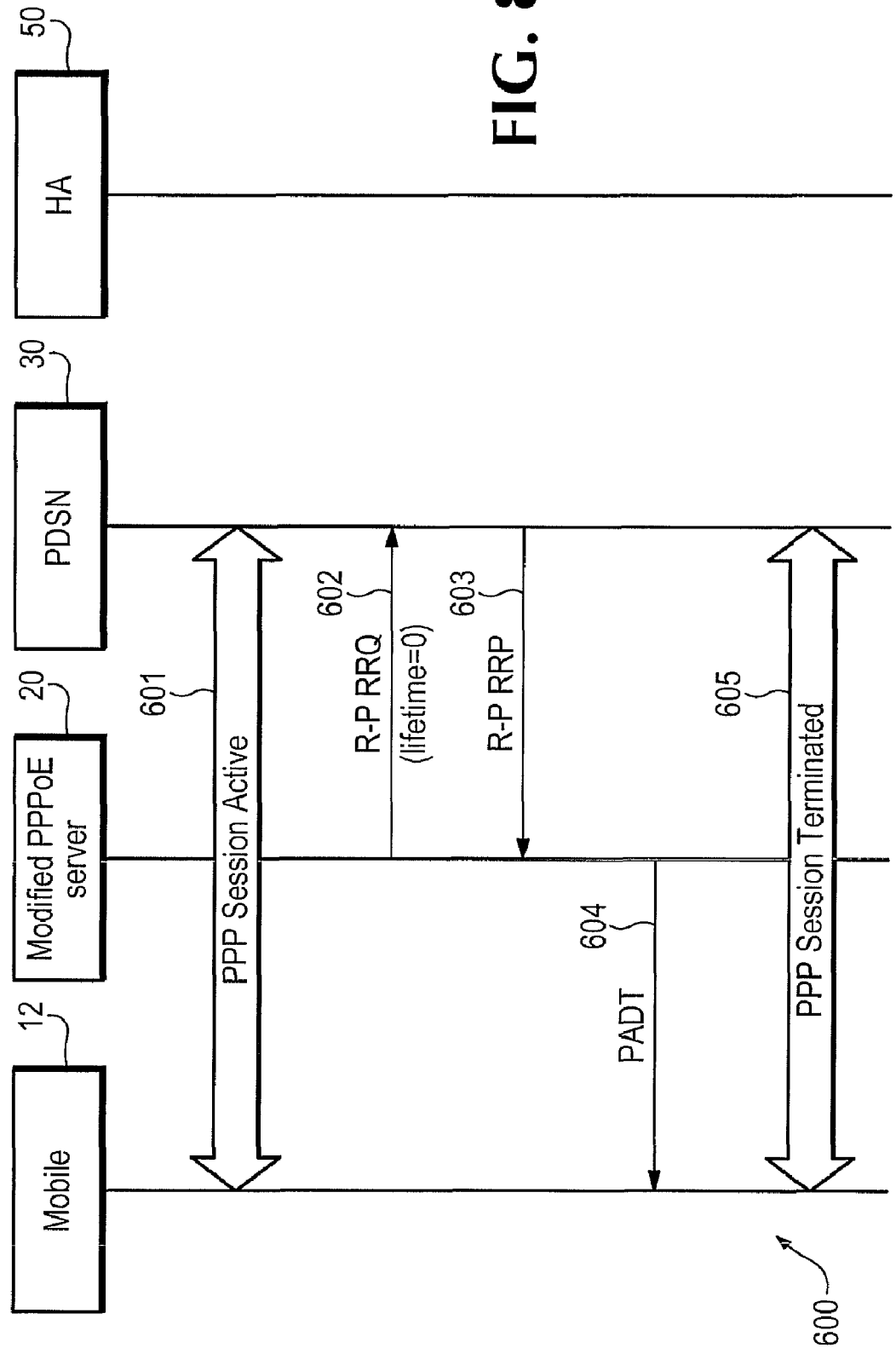
FIG. 8 is a flow diagram illustrating a control server initiated session teardown for the system and method of FIGS. 1-2.

FIG. 8 shows a method 600 for a control server initiated session teardown. As with the previous methods, for ease of reference, the method 600 is shown in FIG. 8 and will described herein as if CDMA was the wireless communication technology chosen. It should be understood, however, that GSM may be chosen as the wireless communication technology instead, with the corresponding GSM components and links replacing those of CDMA.

In the method 600, a PPP session initially exists between the mobile node and the PDSN (represented by reference numeral 601 in FIG. 8). The control server may then choose to terminate the PPP session. The control server performs de-registration with the PDSN by sending an R-P RRQ message with a lifetime value of zero to the PDSN in step 602. Upon accepting this de-registration request, the PDSN responds in step 603 with an R-P RRP. In addition, the control server may optionally send a PADT message to the mobile node (step 604), as shown by the dashed line in FIG. 8. At this point, all PPP contexts have been removed, and no active PPP session exists (step 605) between the mobile node and the PDSN (call clearing is complete).

The exemplary systems and methods of the present invention provide many advantages that are readily apparent from the above detailed description. For example, these systems and methods utilize open standards, such as IEE 802.3, IEE 802.11, PPP, PPPoE, CDMA2000, and GPRS/UMTS. Similarly, the exemplary systems and methods of the present invention utilize stock components, with little or no modifications, that are already in use (or at least standardized) within known wireless access technology (e.g., wireless Ethernet, CDMA, and GSM). Consequently, the present invention may be integrated without difficulty into the existing infrastructure used with such wireless access technology.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer steps and/or elements may be used in the flow/block diagrams. While various elements of the exemplary embodiments described herein may be implemented in software, hardware or firmware implementations may alternatively be used in other embodiments, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method comprising:
   receiving Point-to-Point over Ethernet (PPPoE) signaling messages from a first device;
   receiving radio access network to packet data service node (R-P) signaling messages from a second device;
   translating the received PPPoE signaling messages to R-P signaling messages for transmission to the second device; and
   translating the received R-P signaling messages to PPPoE signaling messages for transmission to the first device.

2. The method according to claim 1, further comprising:
   establishing a Point-to-Point (PPP) session having the first device as a first end point of the PPP session and having the second device as a second end point of the PPP session.

3. The method according to claim 1, further comprising:
   translating a PPPoE Active Discovery Request (PADR) PPPoE signaling message to a P-R Registration Request message.

4. The method according to claim 1, further comprising:
   translating a R-P Registration Reply to a PPPoE Active Discovery Session-confirmation (PADS) message.

5. The method according to claim 1, further comprising:
   translating a R-P Registration Reply to a PPPoE Active Discovery Terminate (PADT) message.

6. The method according to claim 1, further comprising:
   translating a PADT message to a R-P Registration Request message having a lifetime field equal to zero.

7. The method according to claim 1, further comprising:
   tearing down a PPP session having the first device as a first end point of the PPP session and the second device as a second end point of the PPP session.

8. The method according to claim 1, wherein receiving the PPPoE signaling messages further comprises receiving the PPPoE signaling messages from the first device in a first network interface of a control server and wherein receiving the R-P signaling messages further comprises receiving the R-P signaling messages from the second device in a second network interface of the control server.

9. The method according to claim 1, wherein translating the received PPPoE signaling messages to R-P signaling messages further comprises translating the received PPPoE signaling messages to R-P signaling messages in a first logic unit of a control server and wherein translating the received R-P signaling messages to PPPoE signaling messages further comprises translating the received R-P signaling messages to PPPoE signaling messages in a second logic unit of the control server.

10. The method according to claim 1, further comprising:
    transmitting the translated R-P signaling messages to the second device.

11. The method according to claim 1, further comprising:
    transmitting the translated PPPoE signaling messages to the first device.

12. A method comprising:
    receiving Point-to-Point over Ethernet (PPPoE) signaling messages from a first device;
    receiving General Packet Radio Service (GPRS) tunneling protocol (GTP) signaling messages from a second device;
    translating the received PPPOE signaling messages to GTP signaling messages for transmission to the second device; and
    translating the received GTP signaling messages to PPPoE signaling messages for transmission to the first device.

13. The method according to claim 12, further comprising:
    establishing a Point-to-Point (PPP) session having the first device as a first end point of the PPP session and having the second device as a second end point of the PPP session.

14. The method according to claim 12, wherein receiving the PPPoE signaling messages further comprises receiving the PPPoE signaling messages from the first device in a first network interface of a control server and wherein receiving the GPRS signaling messages further comprises receiving the GPRS signaling messages from the second device in a second network interface of the control server.

15. The method according to claim 12, wherein translating the received PPPoE signaling messages to GPRS signaling messages further comprises translating the received PPPoE signaling messages to GPRS signaling messages in a first logic unit of a control server and wherein translating the received GPRS signaling messages to PPPoE signaling messages further comprises translating the received GPRS signaling messages to PPPoE signaling messages in a second logic unit of the control server.

16. The method according to claim 12, further comprising:
    transmitting the translated GTP signaling messages to the second device.

17. The method according to claim 12, further comprising:
    transmitting the translated PPPoE signaling messages to the first device.

* * * * *